J. TOUTGES.
EXTENSIBLE CAR STEP.
APPLICATION FILED MAR. 22, 1921.

1,388,493.

Patented Aug. 23, 1921.
2 SHEETS—SHEET 1.

Inventor
J. Toutges
By L. Swift
Attorney

J. TOUTGES.
EXTENSIBLE CAR STEP.
APPLICATION FILED MAR. 22, 1921.

1,388,493.

Patented Aug. 23, 1921.
2 SHEETS—SHEET 2.

Inventor
J. Toutges

By D. Swift
Attorney

UNITED STATES PATENT OFFICE.

JASPER TOUTGES, OF HOLLAND, MINNESOTA.

EXTENSIBLE CAR-STEP.

1,388,493.    Specification of Letters Patent.    Patented Aug. 23, 1921.

Application filed March 22, 1921. Serial No. 454,478.

*To all whom it may concern:*

Be it known that I, Jasper Toutges, a citizen of the United States, residing at Holland, in the county of Pipestone, State of Minnesota, have invented a new and useful Extensible Car-Step; and I do hereby declare the following to be a full, clear, and exact description of the invention, such as will enable others skilled in the art to which it appertains to make and use the same.

The invention relates to extensible and foldable car steps, and has for its object to provide a device of this character particularly adapted for railway car steps, and so constructed that the bottom tread and riser may be folded rearwardly and upwardly beneath the lower permanent tread of the car steps through the manipulation of a lever.

A further object is to hingedly connect to the lower tread of the car step a riser, to the lower edge of which riser is hingedly connected a tread and to provide brackets hingedly connected to the hinged tread and extending rearwardly in a horizontal plane, vertically and rearwardly and connected to the crank of a crank shaft, which crank shaft is rotated through the medium of an operating lever disposed adjacent the upper end of the step.

A further object is to provide the vertical portions of the brackets with lugs, which lugs are received in apertures in the rear face of the hinged riser when the steps are extended, thereby securely bracing the hinged step and tread in relation to each other. A further object is to provide a rearwardly and downwardly extending arm adjacent the lower end of the non-movable step, which arm when the steps are extended is engaged by a transversely disposed bar carried by the rear ends of the brackets, said bar and rearwardly extending arm forming means for bracing the bracket when the steps are in extended position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
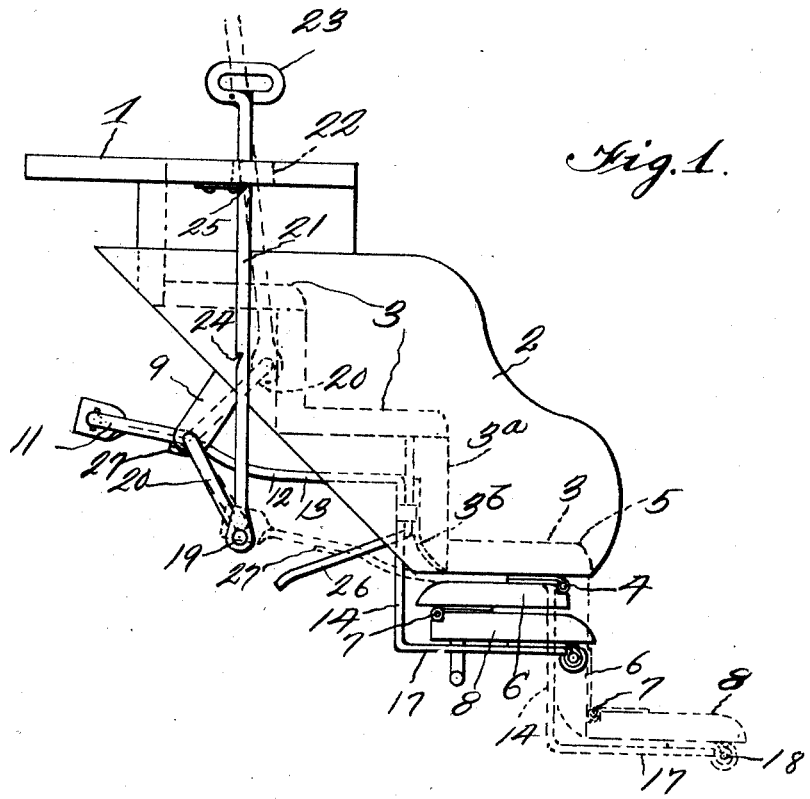
Figure 1 is a side elevation of a conventional form of car step showing the extensible steps and operating mechanism applied thereto.
Figure 4:
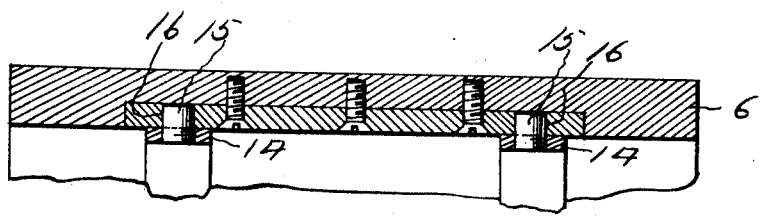
Fig. 4 is a detail sectional view taken on line 4—4 of Fig. 1.
Figure 2:
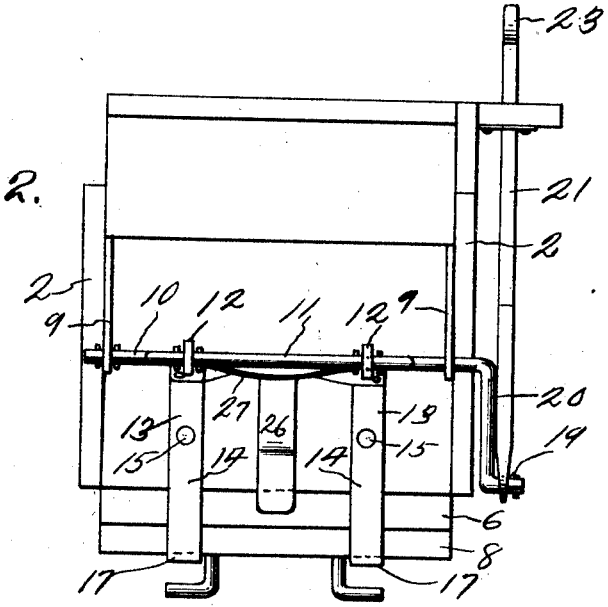
Fig. 2 is a rear view of the steps, showing the steps in folded position.
Figure 3:
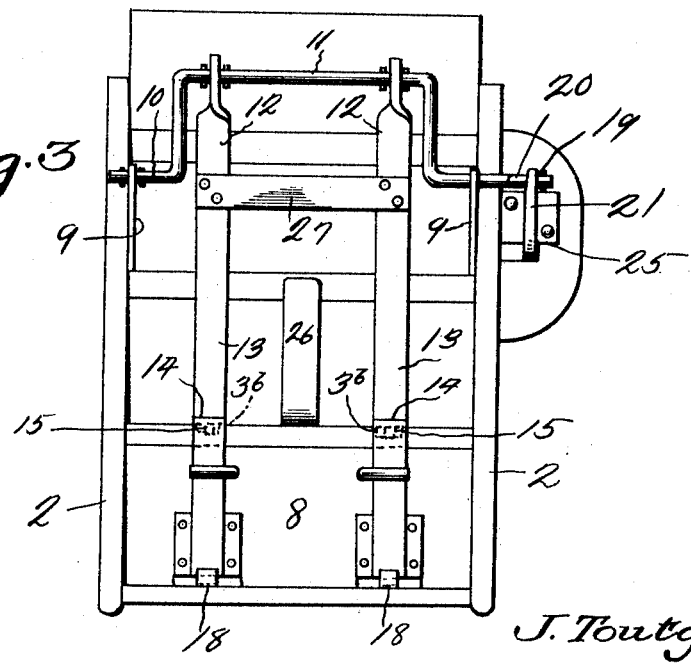
Fig. 3 is a bottom plan view of the steps and operating mechanism, showing the extensible steps in closed position.

Referring to the drawings, the numeral 1 designates a portion of the platform of a car and 2 the sides of downwardly and outwardly extending steps 3, which steps are non-movable. Pivotally secured at 4 to the lower tread 5 of the non-movable steps is a riser 6, to the lower edge of which riser is hingedly connected as at 7, a movable tread 8. When the riser 6 and tread 8 are in extended position as shown in dotted lines in Fig. 1 the riser 6 is vertically disposed and the tread 8 horizontally disposed. The hinging points 4 and 7 are so positioned that when the riser and tread are in vertical and horizontal positions the edges of said riser will abut the under face of the non-movable tread 5 and be limited in its outward movement and the edge of the tread 8 adjacent its hinging point 7 will engage the vertical face of the riser 6 and limit the downward movement of said tread.

Rockably mounted in bearings of rearwardly and downwardly extending brackets 9 carried by the sides 2 of the car steps is a crank shaft 10, which crank shaft is provided with a crank 11, on which crank the rearwardly extending arms 12 of brackets 13 are pivoted. The arms 12 extend forwardly and are provided with vertically disposed portions 14, which portions when the steps are extended engage the rear face of the riser 6 and brace and hold said riser in a vertical position. Vertical portions 14 are provided with lugs 15, which lugs are received in apertures 16 in the rear face of the riser 6 and are additionally braced by said inter-engagement of the lugs with the riser 6. The lower ends of the vertical portions 14 of the brackets 13 extend outwardly at right angles thereby forming horizontally disposed arms 17 disposed below the tread 8, the ends of which arms are pivotally connected as at 18 to the tread 8 adjacent its outer edge. It will be seen that when weight is placed on the tread 8 that said tread and the riser 6 will be rigidly held together by the bracket and particularly by the engagement of the lugs 15 with the apertures 16.

Pivotally connected at 19 to a crank arm 20 of the crank shaft 10 is an upwardly extending operating lever 21. The operating lever 21 extends through an aperture 22 in the platform 1 and terminates in a handle member 23 adapted to be grasped by the operator for forcing the crank arm 20 upwardly for extending the pivoted foldable steps as shown in dotted lines in Fig. 1 or for folding the steps as shown in full lines in Fig. 1. The operating bar 21 is provided with a notch 24, which notch when the bar is in raised position and the steps extended engages a plate 25, by means of which plate the bar is held against downward movement and consequently the foldable steps additionally held against wabbling or other play which may be developed incident to wear. However, as an additional brace for preventing movement of the brackets 13 as a whole, a rearwardly and downwardly extending arm 26 is carried by the non-movable steps, and with which arm a transversely disposed bar 27 which connects the arms 12 of the brackets 13 engages and jams when the steps are extended. This action forces the arms 12 of the brackets into close binding engagement with the under face of the lower non-movable tread 3, thereby bracing the lower ends of the brackets as a whole in such a manner that springing of said ends will be prevented incident to heavy persons using the extended and extensible steps. The rear face of the non-movable vertically disposed riser 3ª is recessed as at 3ᵇ for the reception of the lugs 15 when the car steps are folded as shown in full lines in Fig. 1.

From the above it will be seen that an extensible car step is provided which is simple in construction and one wherein the foldable step sections will be rigidly braced when extended, thereby obviating springing of the steps incident to the weight of persons using the same. It will also be seen that the lower step sections may be folded upon themselves in such a manner that the steps as a whole will be disposed where they will not contact with platforms or other obstructions beside the roadbed.

The invention having been set forth what is claimed as new and useful is:—

1. The combination with the steps of a railway car, of extensible steps therefor, said extensible steps comprising a hinged riser hingedly connected to the steps adjacent its upper edge, a tread hingedly connected to the riser adjacent its lower edge, brackets hingedly connected to the hinged tread adjacent its forward edge, said brackets being provided with horizontally disposed arms disposed beneath the hinged tread, vertically disposed portions carried by said brackets and adapted to engage the rear face of the hinged riser when said riser is in extended position, lugs carried by said vertically disposed portions and adapted to be received in apertures of the rear face of the hinged riser when in extended position, rearwardly extending horizontally disposed arms carried by the brackets and adapted to engage the under face of the lower non-movable tread of the steps when the foldable steps are extended, a crank rockably mounted in bearings of the car steps, the rear ends of said brackets being pivotally connected to said crank, means for rocking said crank, a rearwardly and downwardly extending arm carried by the steps and positioned between the brackets, a transversely disposed bar connecting the brackets adjacent their rear ends, said transversely disposed bar being so positioned that when the steps are in extended position it will engage and bind against the rearwardly and downwardly extended arm carried by the steps.

2. The combination with a foldable car step, said step comprising a hinged riser and tread and a right angled bracket having the end of one of its arms pivoted to the tread section adjacent its free edge and a vertically disposed portion adapted to engage the rear face of the riser, of lugs carried by said vertically disposed portion and adapted to be received in apertures in the rear face of the tread.

3. The combination with a foldable car step, said step comprising a hinged riser and tread and a right angled bracket having the end of one of its arms pivoted to the tread section adjacent its free edge and its vertical portion adapted to engage the rear face of the riser, of means for rigidly interengaging the vertical portion of the bracket with the riser when said car step is extended.

In testimony whereof I have signed my name to this specification in the presence of two subscribing witnesses.

JASPER TOUTGES.

Witnesses:
PAUL REIKON,
AMBROSE HOLLAND.